United States Patent
Sugaya

(10) Patent No.: US 10,510,261 B2
(45) Date of Patent: *Dec. 17, 2019

(54) APPLICATION AND METHOD FOR CONTROLLING FLIGHT OF UNINHABITED AIRBORNE VEHICLE

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/532,570

(22) PCT Filed: May 31, 2016

(86) PCT No.: PCT/JP2016/066041
§ 371 (c)(1),
(2) Date: Jun. 2, 2017

(87) PCT Pub. No.: WO2017/208355
PCT Pub. Date: Dec. 7, 2017

(65) Prior Publication Data
US 2019/0080620 A1 Mar. 14, 2019

(51) Int. Cl.
*G08G 5/00* (2006.01)
*B64C 39/02* (2006.01)
(Continued)

(52) U.S. Cl.
CPC .......... *G08G 5/0069* (2013.01); *B64C 13/16* (2013.01); *B64C 39/02* (2013.01); *B64C 39/024* (2013.01);
(Continued)

(58) Field of Classification Search
CPC .. G08G 5/0069; G08G 5/0039; B64C 39/024; B64C 2201/123; B64C 2201/127;
(Continued)

(56) References Cited

U.S. PATENT DOCUMENTS

2014/0297067 A1 10/2014 Malay
2014/0313332 A1 10/2014 Sabe et al.
(Continued)

FOREIGN PATENT DOCUMENTS

JP 2005-263105 9/2005
JP 2014-122019 7/2014
(Continued)

*Primary Examiner* — Rodney A Butler
(74) *Attorney, Agent, or Firm* — Lex IP Meister, PLLC

(57) ABSTRACT

The present invention is to provide an application for controlling the flight of an uninhabited airborne vehicle that detects a person at low cost and high efficiency and controls a drone to keep from hitting against the detected person. The application for controlling the flight of an uninhabited airborne vehicle runs on a smart device 200 connected with an uninhabited airborne vehicle 100, acquires and analyzes the image taken by a camera unit 20 of the smart device, and controls the flight of the uninhabited airborne vehicle to keep the uninhabited airborne vehicle 100 from hitting against the detected person through the uninhabited airborne vehicle flight control module 224.

7 Claims, 13 Drawing Sheets

(51) Int. Cl.
*G06K 9/00* (2006.01)
*G05D 1/10* (2006.01)
*B64C 13/16* (2006.01)
*G05D 1/00* (2006.01)
*G05D 1/04* (2006.01)
*G06T 1/00* (2006.01)

(52) U.S. Cl.
CPC ........... *G05D 1/102* (2013.01); *G06K 9/0063* (2013.01); *G06K 9/00342* (2013.01); *G06K 9/00664* (2013.01); *G08G 5/006* (2013.01); *G08G 5/0013* (2013.01); *G08G 5/0021* (2013.01); *B64C 2201/123* (2013.01); *B64C 2201/127* (2013.01); *B64C 2201/145* (2013.01); *G05D 1/0088* (2013.01); *G05D 1/0094* (2013.01); *G05D 1/042* (2013.01); *G05D 1/101* (2013.01); *G06T 1/0014* (2013.01); *G08G 5/0039* (2013.01)

(58) Field of Classification Search
CPC ........... B64C 2201/145; G06T 1/0014; G05D 1/042; G05D 1/0094; G05D 1/0088; G05D 1/101

See application file for complete search history.

(56) References Cited

U.S. PATENT DOCUMENTS

| | | | |
|---|---|---|---|
| 2014/0316616 A1 | 10/2014 | Kugelmass | |
| 2016/0041255 A1* | 2/2016 | Berumen | A01K 11/006 |
| | | | 701/2 |
| 2016/0313734 A1* | 10/2016 | Enke | G05D 1/0088 |
| 2016/0332747 A1* | 11/2016 | Bradlow | B64D 47/08 |
| 2016/0376004 A1* | 12/2016 | Claridge | B64C 19/00 |
| | | | 701/3 |
| 2017/0043862 A1* | 2/2017 | Lippincott | B64C 13/50 |
| 2017/0182407 A1* | 6/2017 | Steele | A63F 13/235 |
| 2017/0369164 A1* | 12/2017 | Klein | B64C 39/024 |

FOREIGN PATENT DOCUMENTS

| | | |
|---|---|---|
| JP | 2014-199548 | 10/2014 |
| JP | 2014-212479 | 11/2014 |

\* cited by examiner

FIG.1
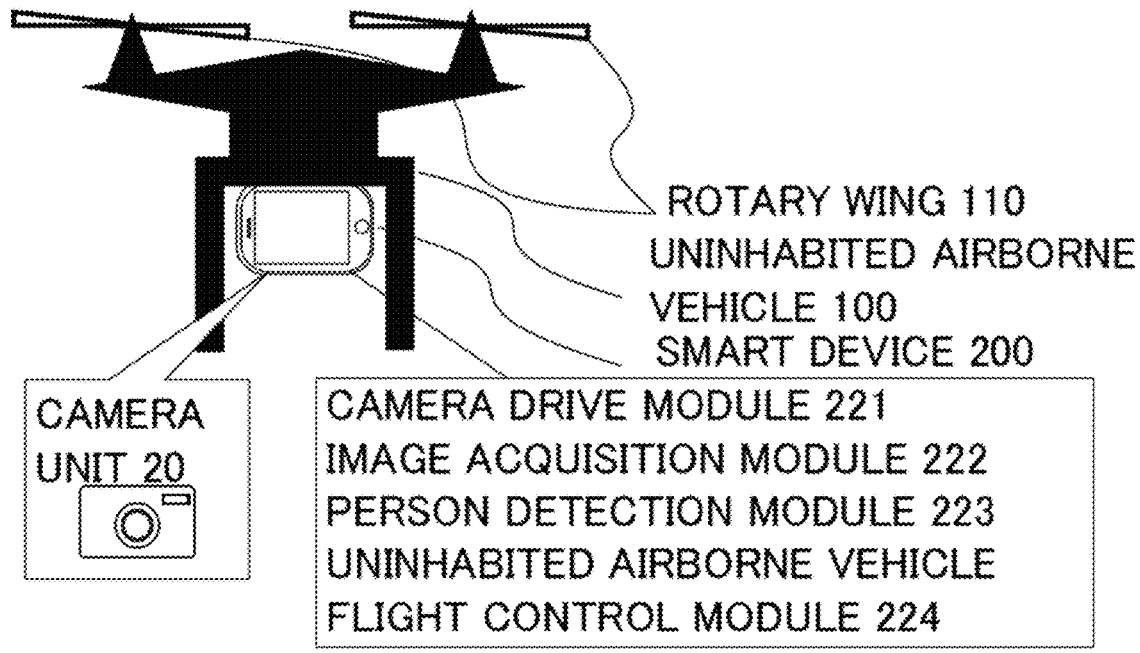
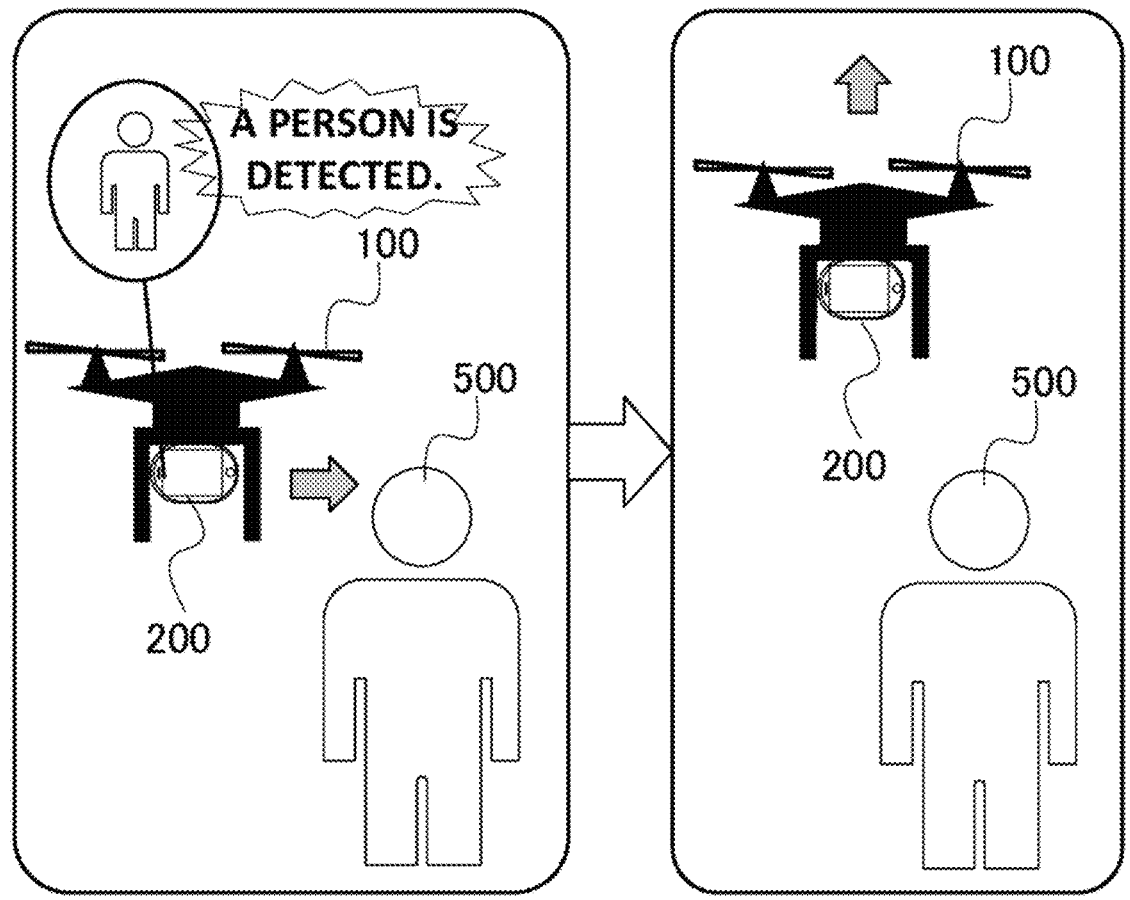

APPLICATION AND METHOD FOR CONTROLLING FLIGHT OF UNINHABITED AIRBORNE VEHICLE

TECHNICAL FIELD

The present invention relates to an application and a method for controlling the flight of an uninhabited airborne vehicle that analyze an image taken with a camera provided in a smart device connected with the uninhabited airborne vehicle detect a person, and control the uninhabited airborne vehicle to keep from hitting against the detected person.

BACKGROUND ART

Recently, uninhabited airborne vehicles that are called drones have been spread and used in various fields, for example, taking a picture from the sky and delivering packages. Although drones indicate all the uninhabited airborne vehicles, many are of multirotor types with a plurality of rotary wings as their main characteristics, which can control the direction and the altitude of the airframe and can be controlled by a communication method such as radio, Wi-Fi®, and Bluetooth®.

However, there are concerns that collisions between a drone and a person increase as the number of drones increases with the growing popularity of drones. Conventional drone control systems detect a person by an ultrasonic sensor that affects the rotary wings, and therefore inaccurately detect persons.

As a method of having a drone detecting an object by using a device other than an ultrasonic sensor, the sensor system of an uninhabited airborne vehicle that is provided with a photodetection and ranging system and a camera system to check the diameters of any number of trees in a group is proposed (Patent Document 1).

CITATION LIST

Patent Literature

Patent Document 1: JP 2014-122019A

SUMMARY OF INVENTION

However, the system of Patent Document 1 needs to prepare a plurality of uninhabited airborne vehicles and have a photodetection and ranging system, as a sensor system, and a camera system. Therefore, the system of Patent Document 1 cannot effectively detect a person with only one uninhabited airborne vehicle. In addition, there are cost problems involved in providing a sensor system with the main body of an uninhabited airborne vehicle.

In view of the above-mentioned problems, an objective of the present invention to provide an application and a method for controlling the flight of an uninhabited airborne vehicle that detect a person at low cost and high efficiency and control a drone to keep from hitting against the detected person.

The first aspect of the present invention provides an application for controlling the flight of an uninhabited airborne vehicle that runs on a smart device connected with the uninhabited airborne vehicle including:

a camera drive unit that drives a camera provided in the smart device;

an image acquisition unit that acquires an image taken by the camera;

a person detection unit that analyzes the acquired image and detects a person; and an uninhabited airborne vehicle flight control unit that controls the flight of the uninhabited airborne vehicle to keep the uninhabited airborne vehicle from hitting against the detected person.

According to the first aspect of the present invention, an application for controlling the flight of an uninhabited airborne vehicle that runs on a smart device connected with the uninhabited airborne vehicle includes: a camera drive unit that drives a camera provided in the smart device; an image acquisition unit that acquires an image taken by the camera; a person detection unit that analyzes the acquired image and detects a person; and an uninhabited airborne vehicle flight control unit that controls the flight of the uninhabited airborne vehicle to keep the uninhabited airborne vehicle from hitting against the detected person.

The first aspect of the present invention is the category of an application for controlling the flight of an uninhabited airborne vehicle, but the category of a method for controlling the flight of an uninhabited airborne vehicle has similar functions and effects.

The second aspect of the present invention provides the application according to the first aspect of the present invention, in which the person detection unit analyzes the image taken by visible light.

According to the second aspect of the present invention, in the application according to the first aspect of the present invention, the person detection unit analyzes the image taken by visible light.

The third aspect of the present invention provides the application according to the first aspect of the present invention, in which the person detection unit analyzes the image taken by thermal photography.

According to the third aspect of the present invention, in the application according to the first aspect of the present invention, the person detection unit analyzes the image taken by thermal photography.

The fourth aspect of the present invention provides the application according to any one of the first to the third aspects of the present invention, further including an operation history display unit that displays operation history of the uninhabited airborne vehicle, the flight of which is controlled by the uninhabited airborne vehicle flight control unit, on an output unit of the smart device.

According to the fourth aspect of the present invention, the application according to any one of the first to the third aspects of the present invention further includes an operation history display unit that displays operation history of the uninhabited airborne vehicle, the flight of which is controlled by the uninhabited airborne vehicle flight control unit, on an output unit of the smart device.

The fifth aspect of the present invention provides the application according to any one of the first to the fourth aspects of the present invention, further including an operation data transmission unit that transmits operation data on the uninhabited airborne vehicle, the flight of which is controlled by the uninhabited airborne vehicle flight control unit, to a server connected through a network According to the fifth aspect of the present invention provides the application according to any one of the first to the fourth aspects of the present invention further includes an operation data transmission unit that transmits operation data on the uninhabited airborne vehicle, the flight of which is controlled by the uninhabited airborne vehicle flight control unit, to a server connected through a network.

The sixth aspect of the present invention provides the application according to any one of the first to the fifth aspects of the present invention, further including a speed control unit that controls the speed of the uninhabited airborne vehicle based on the battery level of a rechargeable battery of the smart device when the rechargeable battery feeds power to the connected uninhabited airborne vehicle.

According to the sixth aspect of the present invention, the application according to any one of the first to the fifth aspects of the present invention further includes a speed control unit that controls the speed of the uninhabited airborne vehicle based on the battery level of a rechargeable battery of the smart device when the rechargeable battery feeds power to the connected uninhabited airborne vehicle.

The seventh aspect of the present invention provides the application according to any one of the first to the sixth aspects of the present invention, in which the uninhabited airborne vehicle is connected with the smart device through USB.

According to the seventh aspect of the present invention, in the application according to any one of the first to the sixth aspects of the present invention, the uninhabited airborne vehicle is connected with the smart device through USB.

The eighth aspect of the present invention provides a smart device including the application according to any one of the first to the seventh aspects of the present invention.

The ninth aspect of the present invention provides an uninhabited airborne vehicle that is automatically controlled by the application according to any one of the first to the seventh aspects of the present invention The tenth aspect of the present invention provides a server connected with the application according to any one of the first to the seventh aspects of the present invention, through a network The eleventh aspect of the present invention provides a method for controlling the flight of an uninhabited airborne vehicle that runs on a smart device connected with the uninhabited airborne vehicle including the steps of
driving a camera provided in the smart device;
acquiring an image taken by the camera;
analyzing the acquired image and detects a person; and
controlling the flight of the uninhabited airborne vehicle to keep the uninhabited airborne vehicle from hitting against the detected person.

The present invention can provide an application and a method of controlling the flight of an uninhabited airborne vehicle that detect a person at low cost and high efficiency and control a drone to keep from hitting against the detected person.

BRIEF DESCRIPTION OF DRAWINGS

FIG. 1 shows a schematic diagram of the uninhabited airborne vehicle 100 and a smart device 200 according to a preferable embodiment of the present invention.

DESCRIPTION OF EMBODIMENTS

Figure 2:
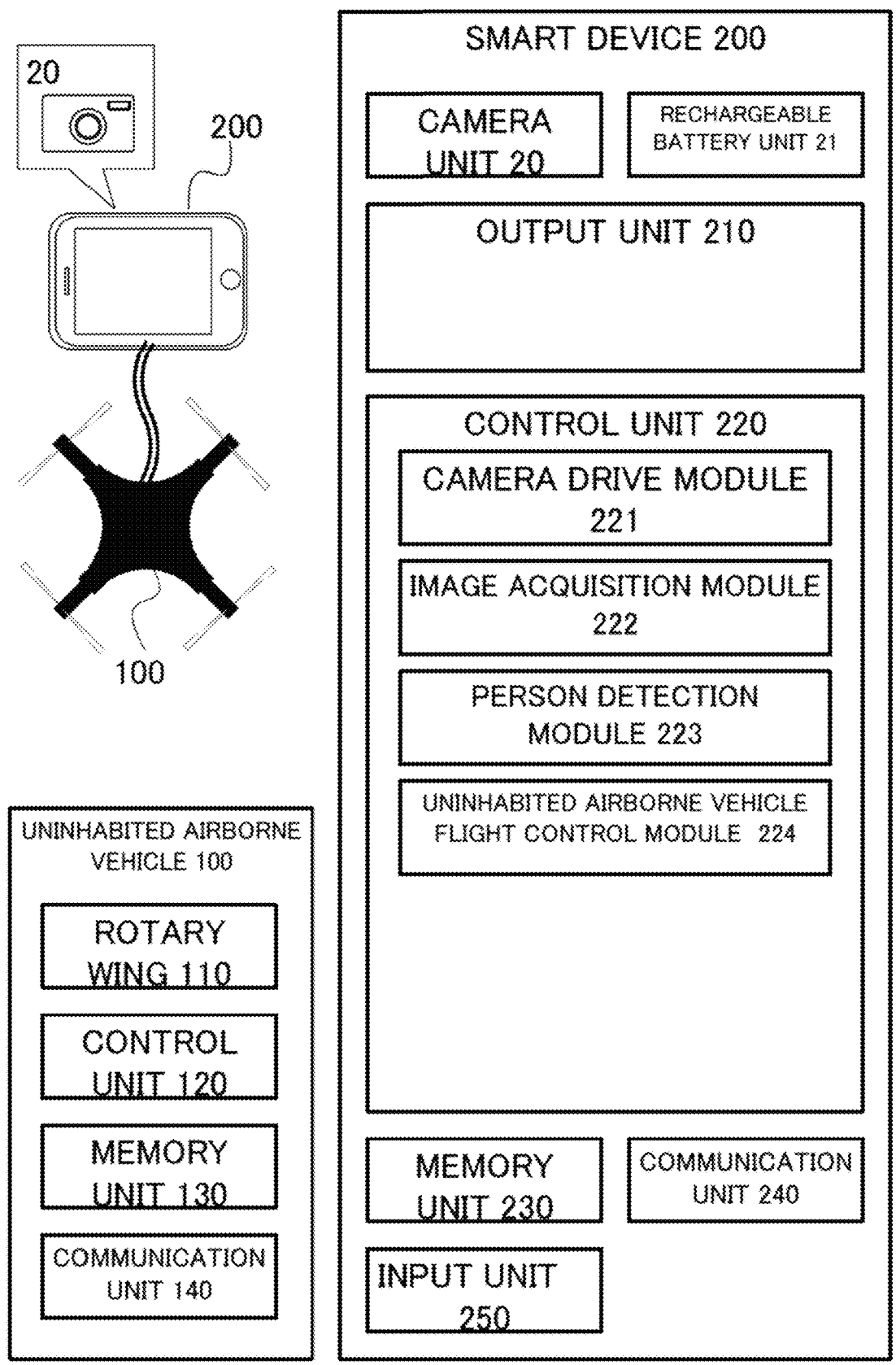
FIG. 2 shows the functional block diagram of the uninhabited airborne vehicle 100 and the smart device 200 to illustrate the relationship among the functions.

Embodiments of the present invention will be described below with reference to the attached drawings. However, these are illustrative only, and the technological scope of the present invention is not limited thereto.

Overview of Uninhabited Airborne Vehicle 100 and Smart Device 200

FIG. 1 shows a schematic diagram of the uninhabited airborne vehicle 100 and a smart device 200 according to a preferable embodiment of the present invention. The overview of the present invention will be described below with reference to FIG. 1.

The upper part of FIG. 1 shows the uninhabited airborne vehicle 100 viewed from the side. The uninhabited airborne vehicle 100 is provided with a smart device 200. In this embodiment, the uninhabited airborne vehicle 100 includes a plurality of rotary wings 110 as an example. The uninhabited airborne vehicle 100 is a drone, etc., provided with rotary wings 110, a control unit 120, a memory unit 130, and a communication unit 140 as shown in FIG. 2.

The smart device 200 is a multifunctional terminal including a camera unit 20, a rechargeable battery unit 21, an output unit 210, a control unit 220, a memory unit 230, a communication unit 240, and an input unit 250 as also shown in FIG. 2. The control unit 220 includes a camera drive module 221, an image acquisition module 222, a person detection module 223, and an uninhabited airborne vehicle flight control module 224. The smart device 200 communicates with the uninhabited airborne vehicle 100 through the communication unit 240 so as to control the uninhabited airborne vehicle 100.

The smart device 200 may be an information appliance such as a smart phone or a tablet terminal with capability to control the uninhabited airborne vehicle 100. The smart phone shown as the smart device 200 in attached drawings is just one example. The smart device 200 may include a global positioning system (hereinafter referred to as "GPS"). In this case, the GPS information including the latitude, the longitude, the altitude, etc., of the uninhabited airborne vehicle 100 provided with the smart device 200 can be acquired.

The smart device 200 may communicate with the uninhabited airborne vehicle 100 through wireless connection that uses the frequency band of, for example, 2.4 GHz which is the same as that used for Wi-Fi® and Bluetooth® or of 73 MHz for a radio controller, or through wired connection with, for example, USB or LAN cables. In the present invention, the communication between the uninhabited airborne vehicle 100 and the smart device 200 only has to be feasible and is not limited in particular. However, if a specialized transmitter (for a radio controller) is used to control usual operation of the uninhabited airborne vehicle 100, the radio communication between the uninhabited airborne vehicle 100 and the transmitter is preferably not affected.

First, the user starts the application for controlling the flight of an uninhabited airborne vehicle of the smart device 200. The application for controlling the flight of an uninhabited airborne vehicle may be started by the input unit 250 of the smart device 200 or by other information devices (not shown) with capability to communicate with the smart device 200 through wireless connection. Alternatively, the smart device 200 may be set to automatically start the application for controlling the flight of an uninhabited airborne vehicle after the uninhabited airborne vehicle 100 starts to fly. The uninhabited airborne vehicle 100 may start to fly before or after the application for controlling the flight of an uninhabited airborne vehicle is started. The usual operation of the uninhabited airborne vehicle 100 may be controlled by using a transmitter for a radio controller, by a program installed in the smart device 200 to autonomously control the uninhabited airborne vehicle 100 to fly along a predetermined course, or by other information devices (not shown) with capability to communicate with the smart device 200 through wireless connection.

Then, the camera drive module 221 of the smart device 200 drives the camera unit 20 to start to take an image. The camera unit 20 may take an image by visible light or thermal photography. If the camera unit 20 has a visible light imaging function and a thermal photography imaging function, the imaging function to be used may be automatically selected or may be set by the user through the input unit 250 of the application for controlling the flight of an uninhabited airborne vehicle.

After the camera unit 20 starts to take an image, the image acquisition module 222 acquires the image taken by the camera unit 20 and stores the acquired image in the memory unit 230. The image acquisition module 222 may control the camera unit 20 to take an image in the flight direction of the uninhabited airborne vehicle 100 while the uninhabited airborne vehicle 100 is flying.

The person detection module 223 analyzes the image stored in the memory unit 230 and detects whether or not the image contains a person. The lower left of FIG. 1 shows an example when the person detection module 223 has detected a person 500 in the flight direction.

If the camera unit 20 takes an image by visible light, the person detection module 223 may detect the feature amount of the taken image by image analysis and detects a person's face or body and may perform a process such as skin-color extraction as well. If the camera unit 20 takes an image by thermal photography, the person detection module 223 uses the fact that the exposed skin has a higher temperature than the other parts to detect a person. The existing technologies may be used to detect a person, which do not limit the present invention in particular.

The uninhabited airborne vehicle flight control module 224 checks whether or not the person detection module 223 has detected a person. If the person detection module 223 has detected a person, the uninhabited airborne vehicle flight control module 224 controls the flight of the uninhabited airborne vehicle 100 to keep the uninhabited airborne vehicle 100 from hitting against the detected person. The control unit 120 of the uninhabited airborne vehicle 100 allows the uninhabited airborne vehicle flight control module 224 to perform the flight control to avoid a person in priority to the usual operation. The lower right of FIG. 1 shows an example when the uninhabited airborne vehicle flight control module 224 makes the uninhabited airborne vehicle 100 go up so as not to hit against a person 500.

The operations of the uninhabited airborne vehicle 100 to fly while avoiding a person by the uninhabited airborne vehicle flight control module 224 may be previously set. Examples of the setting include "go up to the altitude of 2.0 meters," "go up to the altitude of 2.5 meters," "move 1.0 meters to the right," "move 1.2 meters to the left," "hover in place," and "land on the ground." These may be set according to whether the uninhabited airborne vehicle 100 is hovering or moving. Furthermore, the appropriate options corresponding to the speed of the uninhabited airborne vehicle 100 may be displayed and set.

As described above, the present invention can achieve the application for controlling the flight of an uninhabited airborne vehicle that detects a person at low hardware cost and controls the uninhabited airborne vehicle 100 to keep from hitting against the detected person by using a smart device 200 connected with an uninhabited airborne vehicle 100 and a camera unit 20 of the smart device 200. The present invention can also detect a person at high efficiency because it is not affected by the rotary wings 110 compared with when an ultrasonic sensor is used for obstacle detection.

Functions

FIG. 2 shows the functional block diagram of the uninhabited airborne vehicle 100 and the smart device 200 to illustrate the relationship among the functions. The smart device 200 communicates with the uninhabited airborne vehicle 100 through the communication unit 240 so as to control the uninhabited airborne vehicle 100.

The uninhabited airborne vehicle 100 is an aircraft with capability of unmanned flight, such as a drone, which includes a rotary wing 110, a control unit 120, a memory unit 130, and a communication unit 140.

The number of the rotary wings 110 may be more than one. The rotary wing 10 generates floatation enough to fly the uninhabited airborne vehicle 100.

The control unit 120 includes a central processing unit (hereinafter referred to as "CPU"), a random access memory (hereinafter referred to as "RAM"), and a read only memory (hereinafter referred to as "ROM"). The control unit 120 controls the rotary wing 110 as well as the mechanism of the uninhabited airborne vehicle 100 to achieve the flight by usual operation and the flight to avoid a person by the uninhabited airborne vehicle flight control module 224. The usual operation of the uninhabited airborne vehicle 100 may be controlled by using a transmitter for a radio controller, by a program installed in the smart device 200 to autonomously control the uninhabited airborne vehicle 100 to fly along a predetermined course, or by other information devices (not shown) with capability to communicate with the smart device 200 through wireless connection. The control unit 120 achieves the flight by these controls.

The memory unit 130 includes a data storage unit such as a hard disk or a semiconductor memory. The memory unit 130 can store necessary information such as temporary data necessary to autonomously control the wireless aircraft by a program along a predetermined course in addition to data transceived through the communication unit 140.

The communication unit 140 communicates with the smart device 200. The communication between the communication unit 140 and the smart device 200 may be performed through wireless connection that uses the frequency band of, for example, 2.4 GHz which is the same as that used for Wi-Fi® and Bluetooth® or of 73 MHz for a radio controller, or through wired connection with, for example, USB or LAN cables. If a transmitter for a radio controller is used for the usual operation, the communication unit 140 also communicates with the transmitter.

The smart device 200 is a multifunctional terminal including a camera unit 20, a rechargeable battery unit 21, an output unit 210, a control unit 220, a memory unit 230, a communication unit 240, and an input unit 250. The control unit 220 includes a camera drive module 221, an image acquisition module 222, a person detection module 223, and an uninhabited airborne vehicle flight control module 224.

The smart device 200 may be an information appliance such as a smart phone or a tablet terminal with capability to control the uninhabited airborne vehicle 100. The smart phone shown as the smart device 200 in attached drawings is just one example. The smart device 200 may include a GPS. In this case, the GPS information including the latitude, the longitude, the altitude, etc., of the uninhabited airborne vehicle 100 connected with the smart device 200 can be acquired.

The camera unit 20 includes a camera. The image taken by this camera is converted into digital data and stored in the memory unit 230. The camera unit 20 may take an image by visible light or thermal photography. The camera unit 20 has a visible light imaging function or a thermal photography imaging function, or both. The stored image data can be transmitted through the communication unit 240 as required. The image may be a still or a moving image. If the image is a moving image, the control unit 220 can capture a part of the moving image to store in the memory unit 230 as a still image. The obtained taken image is an accurate image with information as much as the user needs. The pixel count and the image quality can be specified.

The rechargeable battery unit 21 is a nickel-cadmium battery, a nickel-hydrogen battery, a lithium-ion polymer secondary battery, etc. If the smart device 200 is connected with the uninhabited airborne vehicle 100 by a cable, the rechargeable battery unit 21 may feed power to the uninhabited airborne vehicle 100. If the smart device 200 is connected with the uninhabited airborne vehicle 100 by a USB cable, the smart device 200 is able to communicate with the uninhabited airborne vehicle 100 and to feed power to the uninhabited airborne vehicle 100.

The output unit 210 has functions necessary to output operation history of the uninhabited airborne vehicle 100, the flight of which is controlled by the uninhabited airborne vehicle flight control module 224. The output unit 210 may output the operation history in various ways, for example, display it on a liquid crystal display and output it by voice. The features of the present invention are not limited in particular by the output method.

The control unit 220 includes a CPU, a RAM, and a ROM. The control unit 220 includes a camera drive module 221, an image acquisition module 222, a person detection module 223, and an uninhabited airborne vehicle flight control module 224. If the uninhabited airborne vehicle 100 is controlled by the smart device 200, for example, if the uninhabited airborne vehicle 100 is autonomously controlled by a program along a predetermined course or if the uninhabited airborne vehicle 100 is controlled by other information devices with capability to communicate with the smart device 200 through wireless connection, the control unit 220 provides instruction to the uninhabited airborne vehicle 100 through the communication unit 240.

The memory unit 230 includes a data storage unit such as a hard disk or a semiconductor memory. The memory unit 230 stores data on the image taken by the camera unit 20. The memory unit 230 is also capable to store necessary data such as temporary data for the person detection module 223 to make an analysis and setting for the uninhabited airborne vehicle flight control module 224 to avoid a person.

The communication unit 240 communicates with the uninhabited airborne vehicle 100. The communication between the communication unit 140 and the smart device 200 may be performed through wireless connection that uses the frequency band of, for example, 2.4 GHz which is the same as that used for Wi-Fi® and Bluetooth® or of 73 MHz for a radio controller, or through wired connection with, for example, USB or LAN cables. If the uninhabited airborne vehicle 100 is controlled by other information devices through the smart device 200, the communication unit 240 also communicates with the information devices through wireless connection.

The input unit 250 has functions necessary to instruct the start of the application for controlling the flight of an uninhabited airborne vehicle and to configure various settings. The input unit 250 may include a liquid crystal display to achieve a touch panel function, a hardware button on the device, and a microphone to perform voice recognition. The features of the present invention are not limited in particular by the input method.

Uninhabited Airborne Vehicle Flight Control Process Based on Person Detection

Figure 3:
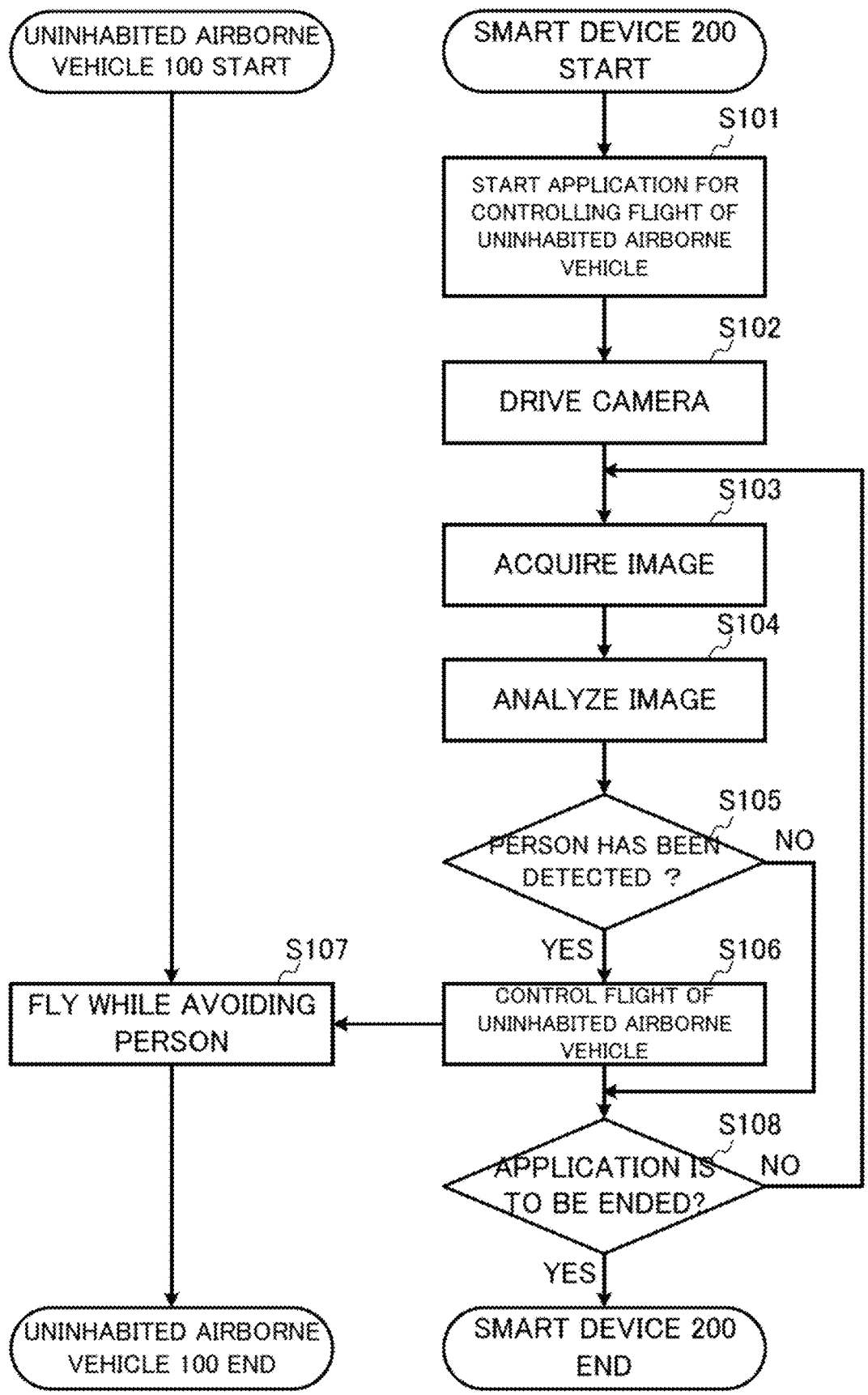
FIG. 3 shows a flow chart of the uninhabited airborne vehicle flight control process based on the person detection performed by the uninhabited airborne vehicle 100 and the smart device 200.

FIG. 3 shows a flow chart of the uninhabited airborne vehicle flight control process based on the person detection performed by the uninhabited airborne vehicle 100 and the smart device 200. The processes performed by the units and the modules of the above-mentioned units are explained below together with this process.

First, the user starts the application for controlling the flight of an uninhabited airborne vehicle of the smart device 200 (Step S101). The application for controlling the flight of an uninhabited airborne vehicle may be started by the input unit 250 of the smart device 200 or by other information devices (not shown) with capability to communicate with the smart device 200 through wireless connection. Alternatively, the smart device 200 may be set to automatically start the application for controlling the flight of an uninhabited airborne vehicle after the uninhabited airborne vehicle 100 starts to fly. The uninhabited airborne vehicle 100 may start to fly before or after the application for controlling the flight of an uninhabited airborne vehicle is started. The usual operation of the uninhabited airborne vehicle 100 may be controlled by using a transmitter for a radio controller, by a program installed in the smart device 200 to autonomously control the uninhabited airborne vehicle 100 to fly along a predetermined course, or by other information devices (not shown) with capability to communicate with the smart device 200 through wireless connection.

Then, the camera drive module 221 of the smart device 200 drives a camera of the camera unit 20 to start to take an image (Step S102). The camera unit 20 may take an image by visible light or thermal photography. If the camera unit 20 has a visible light imaging function and a thermal photography imaging function, the imaging function to be used may be automatically selected, or the function to be used may be set by the user through the input unit 250 of the application for controlling the flight of an uninhabited airborne vehicle.

After the camera unit 20 starts to take an image, the image acquisition module 222 acquires the image taken by the camera unit 20 (Step S103). The image acquisition module 222 converts the acquired image into digital data and stores the digital data in the memory unit 230. The image acquisition module 222 may control the camera unit 20 to take an image in the flight direction of the uninhabited airborne vehicle 100 while the uninhabited airborne vehicle 100 is flying.

Then, the person detection module 223 analyzes the image stored in the memory unit 230 and detects whether or not the image contains a person (Step S104).

Figure 4:
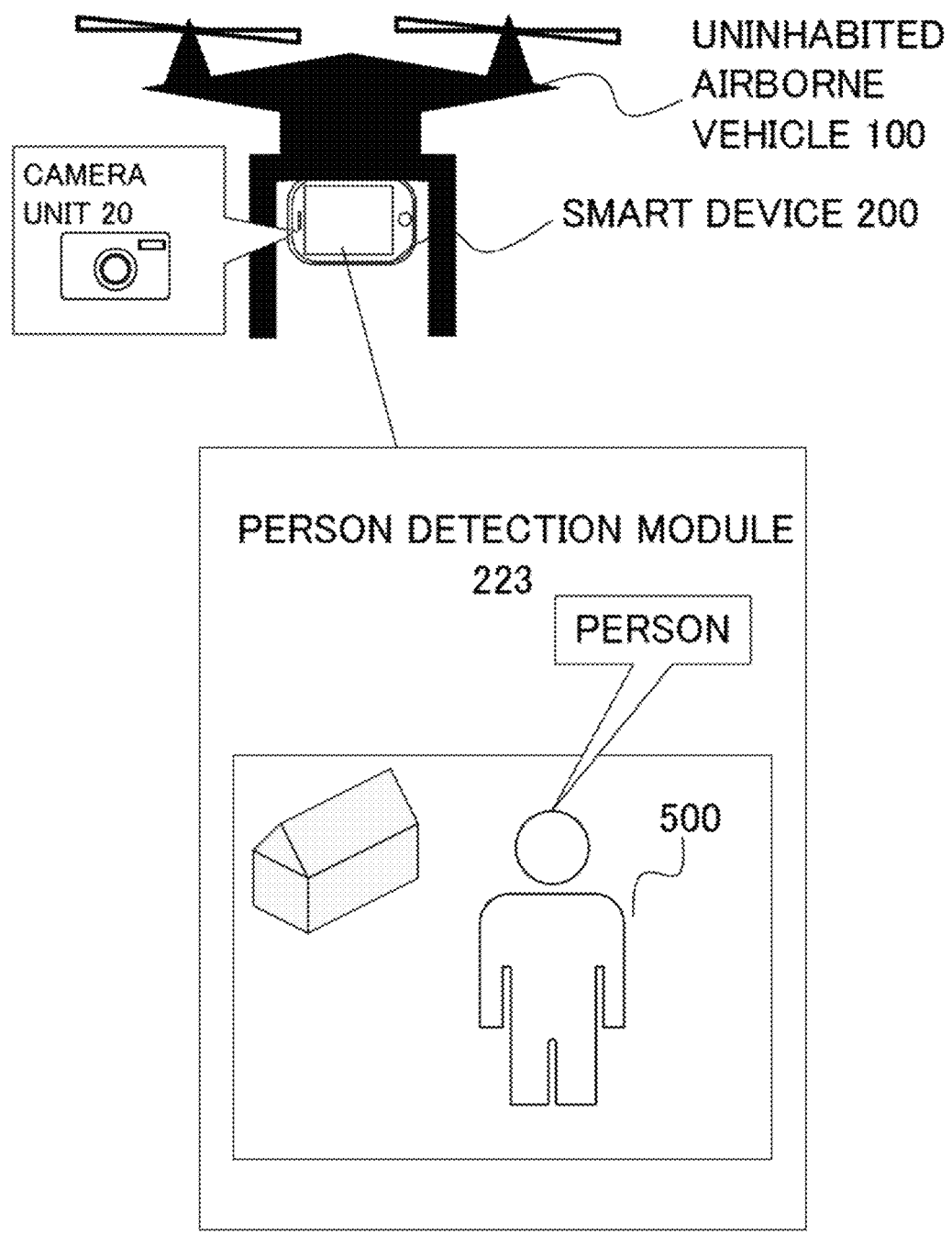
FIG. 4 shows one example of the image analysis performed by the person detection module 223 to analyze an image taken by visible light.

FIG. 4 shows one example of the image analysis performed by the person detection module 223 to analyze an image taken by visible light. If the camera unit 20 takes an image by visible light, the person detection module 223 may detect the feature amount of the taken image by image analysis and detects a person's face or body and may perform a process such as skin-color extraction as well. FIG. 4 shows an image example when a person 500 is detected by image analysis. The existing technologies may be used to detect a person by visible light, which do not limit the present invention in particular.

Figure 5:
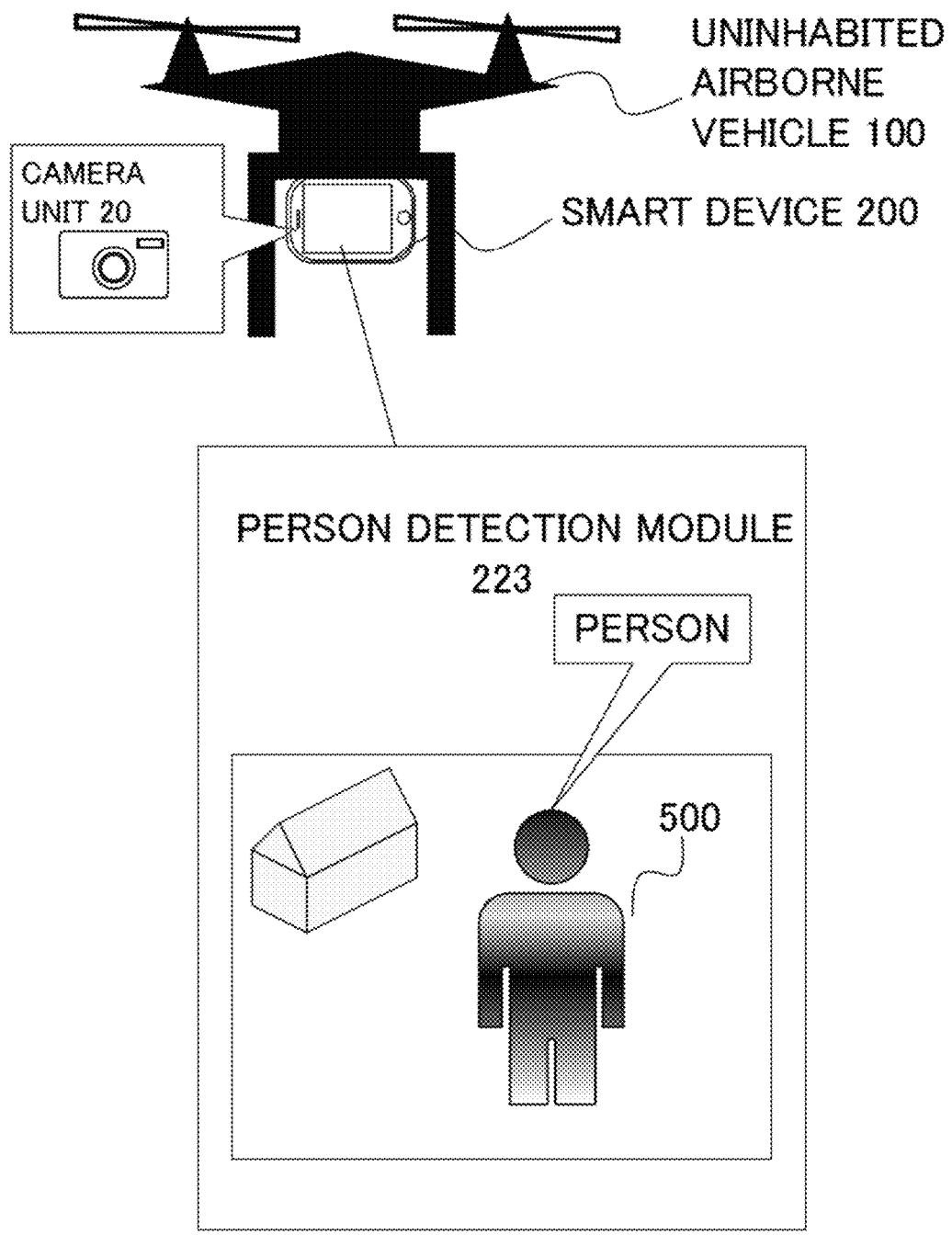
FIG. 5 shows one example of the image analysis performed by the person detection module 223 to analyze an image taken by thermal photography.

FIG. 5 shows one example of the image analysis performed by the person detection module 223 to analyze an image taken by thermal photography. If the camera unit 20 takes an image by thermal photography, the person detection module 223 uses the fact that the exposed skin of a face, hands, etc., has a higher temperature than the other parts to detect a person. FIG. 5 shows an image example when the higher-temperature parts painted in a deep color are detected as a person 500. The existing technologies may be used to detect a person by thermal photography, which do not limit the present invention in particular.

The uninhabited airborne vehicle flight control module 224 checks whether or not the person detection module 223 has detected a person (Step S105).

If the person detection module 223 has detected a person, the uninhabited airborne vehicle flight control module 224 controls the flight of the uninhabited airborne vehicle 100 to keep the uninhabited airborne vehicle 100 from hitting against the detected person through the communication unit 240 (Step S106). The operations of the uninhabited airborne vehicle 100 to fly while avoiding a person may be in the same way all the time or may be previously set if a plurality of the operations are possible. Examples of the setting include "go up to the altitude of 2.0 meters," "go up to the altitude of 2.5 meters," "move 1.0 meters to the right," "move 1.2 meters to the left," "hover in place," and "land on the ground." These may be set according to whether the uninhabited airborne vehicle 100 is hovering or moving. Furthermore, the appropriate options corresponding to the speed of the uninhabited airborne vehicle 100 may be displayed and set.

Figure 6:
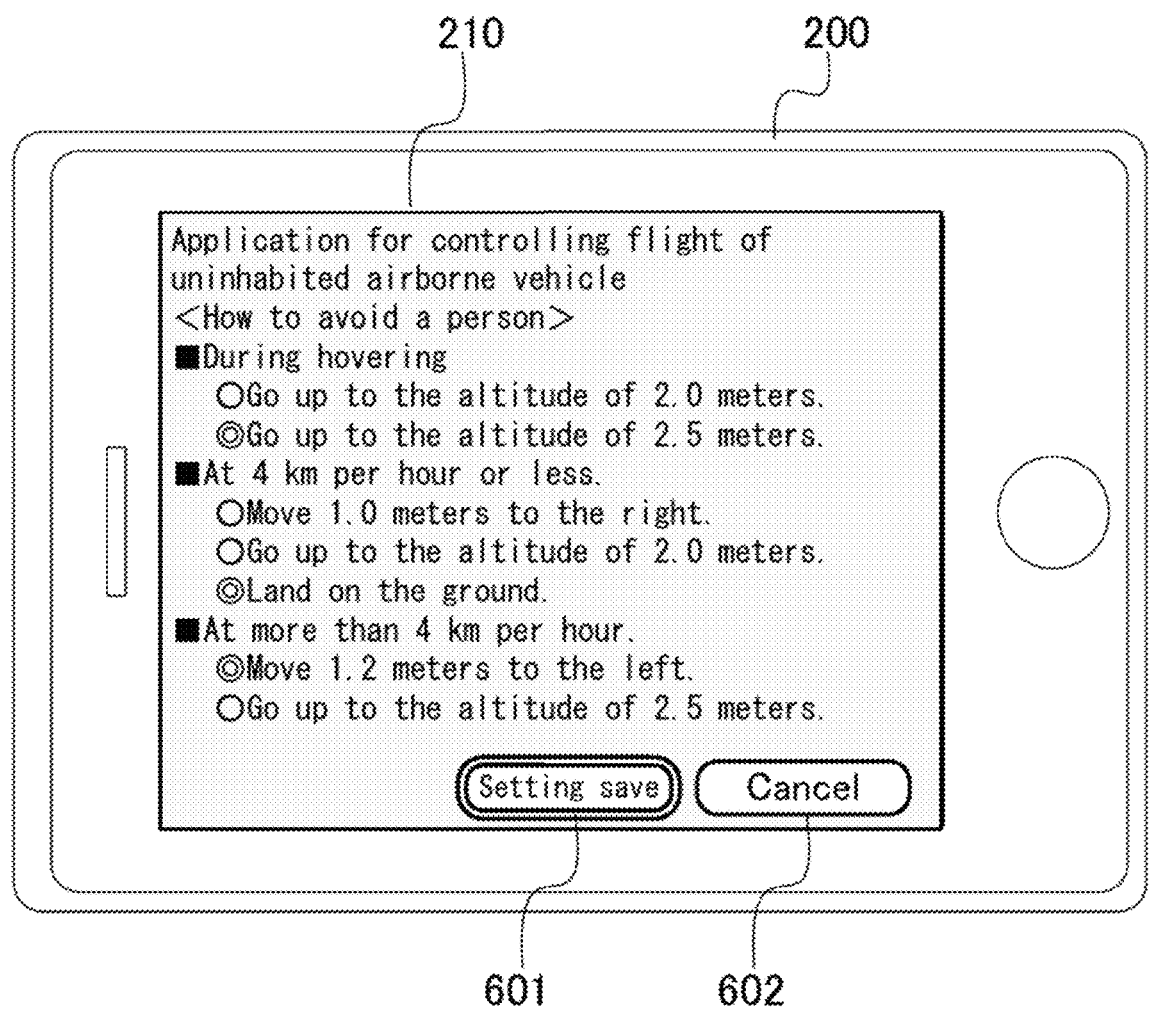
FIG. 6 shows one example of a setting screen for the person avoidance control performed by the uninhabited airborne vehicle flight control module 224.

FIG. 6 shows one example of a setting screen for the person avoidance control performed by the uninhabited airborne vehicle flight control module 224. The setting screen is displayed on the output unit 210 of the smart device 200. In this example, how to avoid a detected person is set according to the three scenes, "during hovering," "at 4 km per hour or less," and "at more than 4 km per hour." The application for controlling the flight of an uninhabited airborne vehicle displays two or more options to avoid a person on the display unit 210. The user selects and sets one of the options by using the radio buttons. FIG. 6 shows an example when "go up to the altitude of 2.5 meters" if a person is detected "during hovering," "land on the ground" if a person is detected during the flight "at 4 km per hour or less," and "move 1.2 meters to the left" if a person is detected during the flight "at more than 4 km per hour" are selected. After using and selecting radio buttons, the user saves the settings by selecting the setting save button 601. If the user selects the cancel button 602, the selected settings are canceled, and the previous settings are used. If the previous settings do not exist, the default settings are used. All the options are appropriately displayed based on the capability of the uninhabited airborne vehicle 100.

The control unit 120 of the uninhabited airborne vehicle 100 controls the rotary wing 110 as well as the mechanism of the uninhabited airborne vehicle 100 to perform the flight to avoid a person in response to the control performed by the uninhabited airborne vehicle flight control module 224 (Step S107). The control unit 120 of the uninhabited airborne vehicle 100 allows the uninhabited airborne vehicle flight control module 224 to perform the flight control to avoid a person in priority to the usual operation.

If a person is not detected in the step S105, the control unit 220 ends the uninhabited airborne vehicle flight control module 224 and proceeds to the next step S108.

The control unit 220 checks whether or not to end the application for controlling the flight of an uninhabited airborne vehicle (Step S108). If judging to end the application, the control unit 220 does so. If judging not to end the application, the control unit 220 returns to the step S103 and continues the process. The application for controlling the flight of an uninhabited airborne vehicle may be ended by the input unit 250 of the smart device 200 or by other information devices (not shown) with capability to communicate with the smart device 200 through wireless connection. Alternatively, the smart device 200 may be set to automatically end the application for controlling the flight of an uninhabited airborne vehicle after the uninhabited airborne vehicle 100 lands on the ground. Furthermore, after a certain time or if the battery level of the rechargeable battery unit 21 decreases below a constant value, the application for controlling the flight of an uninhabited airborne vehicle may be ended.

As described above, the present invention can achieve the application for controlling the flight of an uninhabited airborne vehicle that detects a person at low hardware cost and controls the uninhabited airborne vehicle 100 to keep from hitting against the detected person by using a smart device 200 connected with an uninhabited airborne vehicle 100 and a camera unit 20 of the smart device 200. The present invention can also detect a person at high efficiency because it is not affected by the rotary wing 110 compared with when an ultrasonic sensor is used for obstacle detection.

This example describes the case where the smart device 200 connects with one uninhabited airborne vehicle 100. However, if two or more uninhabited airborne vehicles 100 with different models exist, the models of the uninhabited airborne vehicles 100 may be set for the application for controlling the flight of an uninhabited airborne vehicle.

Accordingly, the application for controlling the flight of an uninhabited airborne vehicle performs the control based on the model settings, so that only one smart device 200 can operate the uninhabited airborne vehicles 100 even if the model of the uninhabited airborne vehicle 100 is changed.

Operation History Display Function

Figure 7:
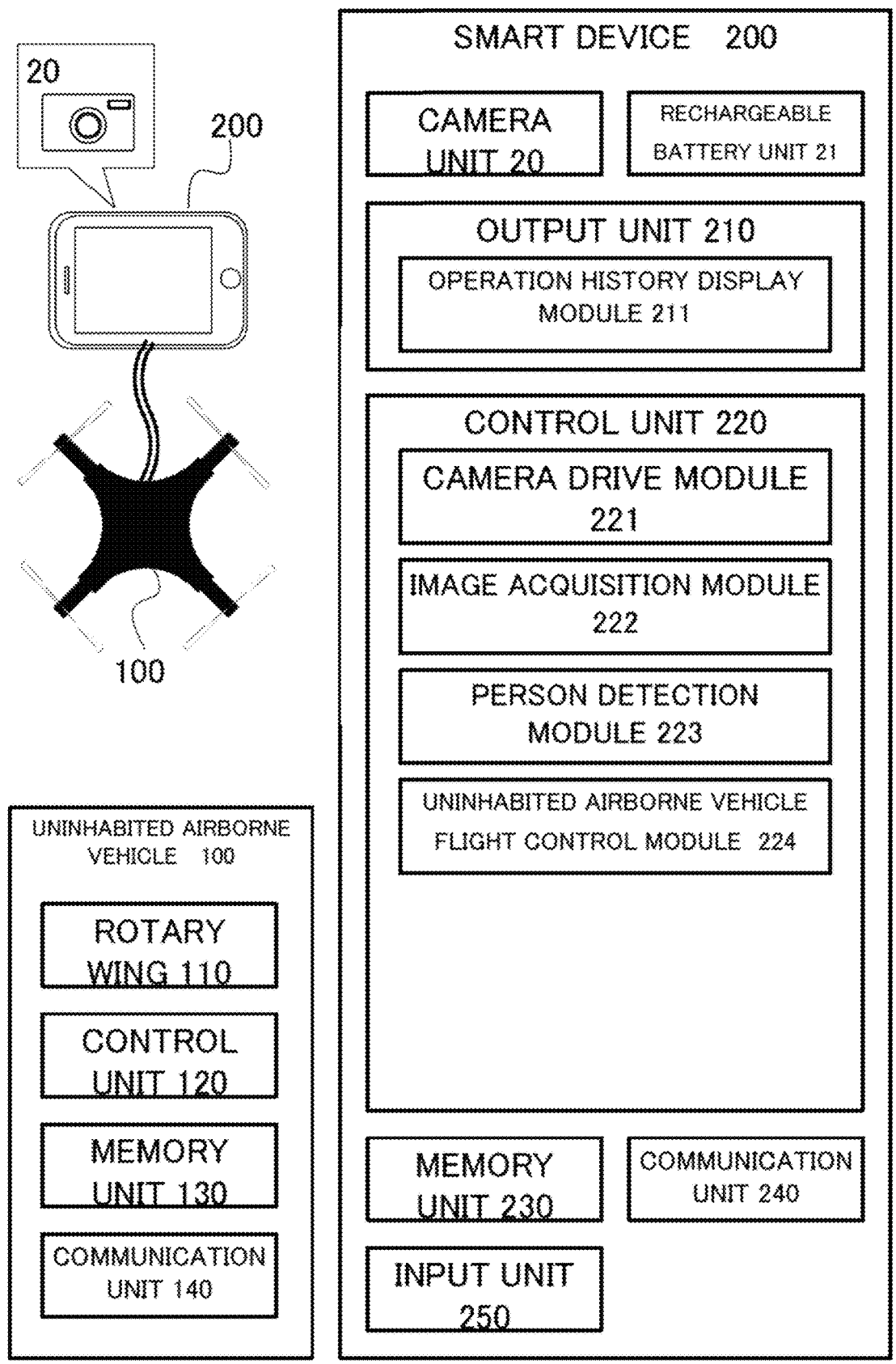
FIG. 7 shows a functional block diagram of the uninhabited airborne vehicle 100 and the smart device 200 with an operation history display function to illustrate the relationship among the functions.

FIG. 7 shows a functional block diagram of the uninhabited airborne vehicle 100 and the smart device 200 with an operation history display function to illustrate the relationship among the functions. The uninhabited airborne vehicle 100 has functions equal to those shown in FIG. 2. The smart device 200 has the operation history display module 211 in the output unit 210 in addition to the functions shown in FIG. 2.

If the setting to display the operation history is configured, the operation history display module 211 displays a detail of the flight control of the uninhabited airborne vehicle 100 that is performed by the uninhabited airborne vehicle flight control module 224 in the step S106 shown in the flow chart of FIG. 3, on the output unit 210 of the smart device 200. As the operation history, not only a detail of the flight control of the uninhabited airborne vehicle 100 that is performed by the uninhabited airborne vehicle flight control module 224 but also a detail of each step shown in the flow chart of FIG. 3 may be displayed. In this case, the operation history display module 211 displays the operation history after each step is performed. The operation history includes a date and time when each step of the flight control application is performed and a detail of the performed control. If the uninhabited airborne vehicle flight control module 224 controls the uninhabited airborne vehicle 100 to avoid a person, a detail of the control for the avoidance is preferably displayed.

Figure 8:
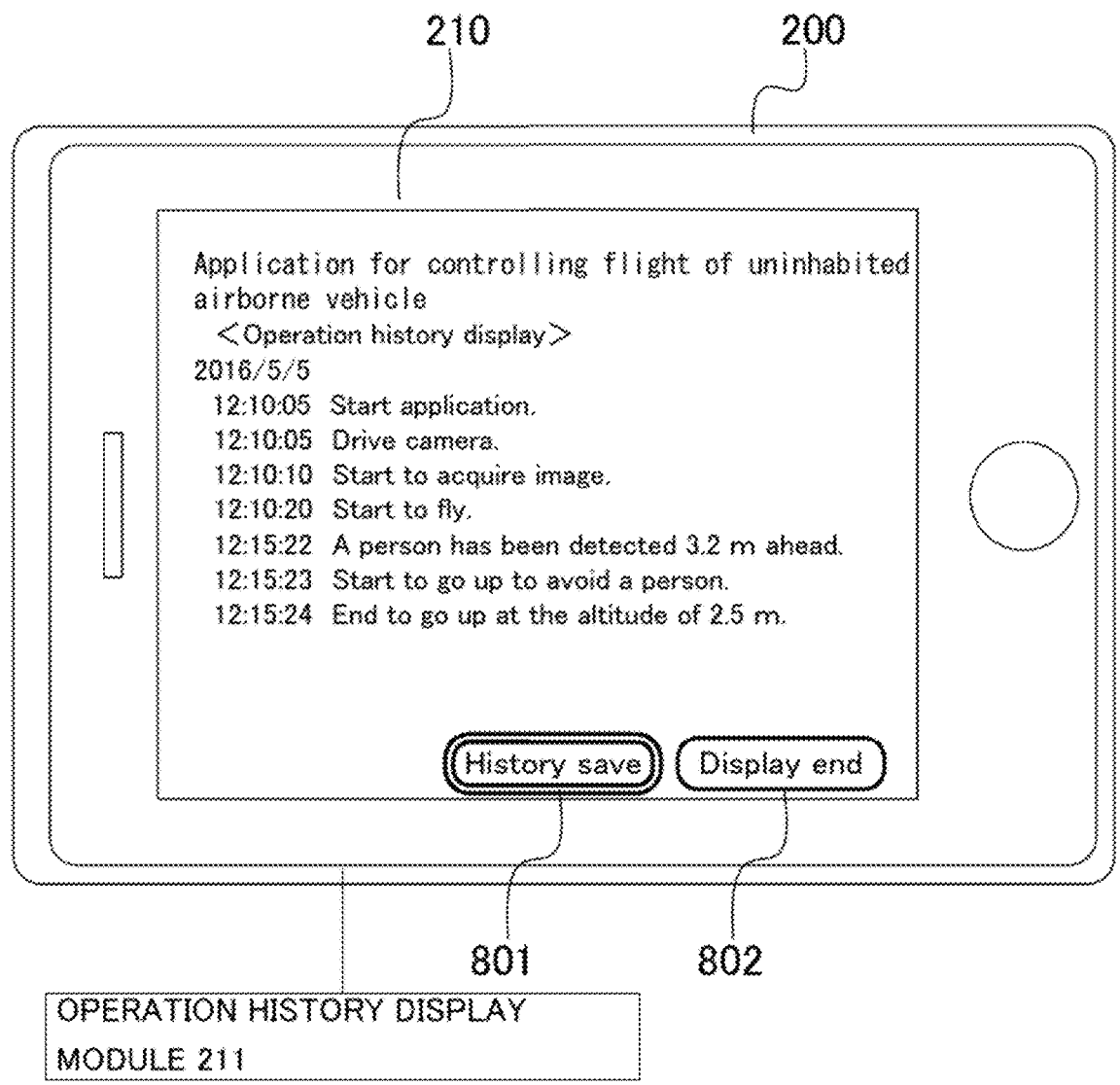
FIG. 8 shows one example of the operation history of the uninhabited airborne vehicle 100 that is displayed on the output unit 210 by the operation history display module 211.

FIG. 8 shows one example of the operation history of the uninhabited airborne vehicle 100 that is displayed on the output unit 210 by the operation history display module 211. As the operation history, the date and time, "2016 May, 5" and the detail of the control at each time are displayed on the output unit 210 of the smart device 200. If the operation history increases in length, the latest operation history and the past operation history can be preferably viewed by using a scrollbar, etc. If the history save button 801 is selected, the displayed operation history is saved in the memory unit 230. If the display end button 802 is selected, the display of the operation history is ended.

As described above, the operation history display function provided in the smart device 200 allows the operations of the uninhabited airborne vehicle 100 and the smart device 200 to be verified and checked after the uninhabited airborne vehicle 100 ends to fly.

Operation Data Transmission Function

Figure 9:
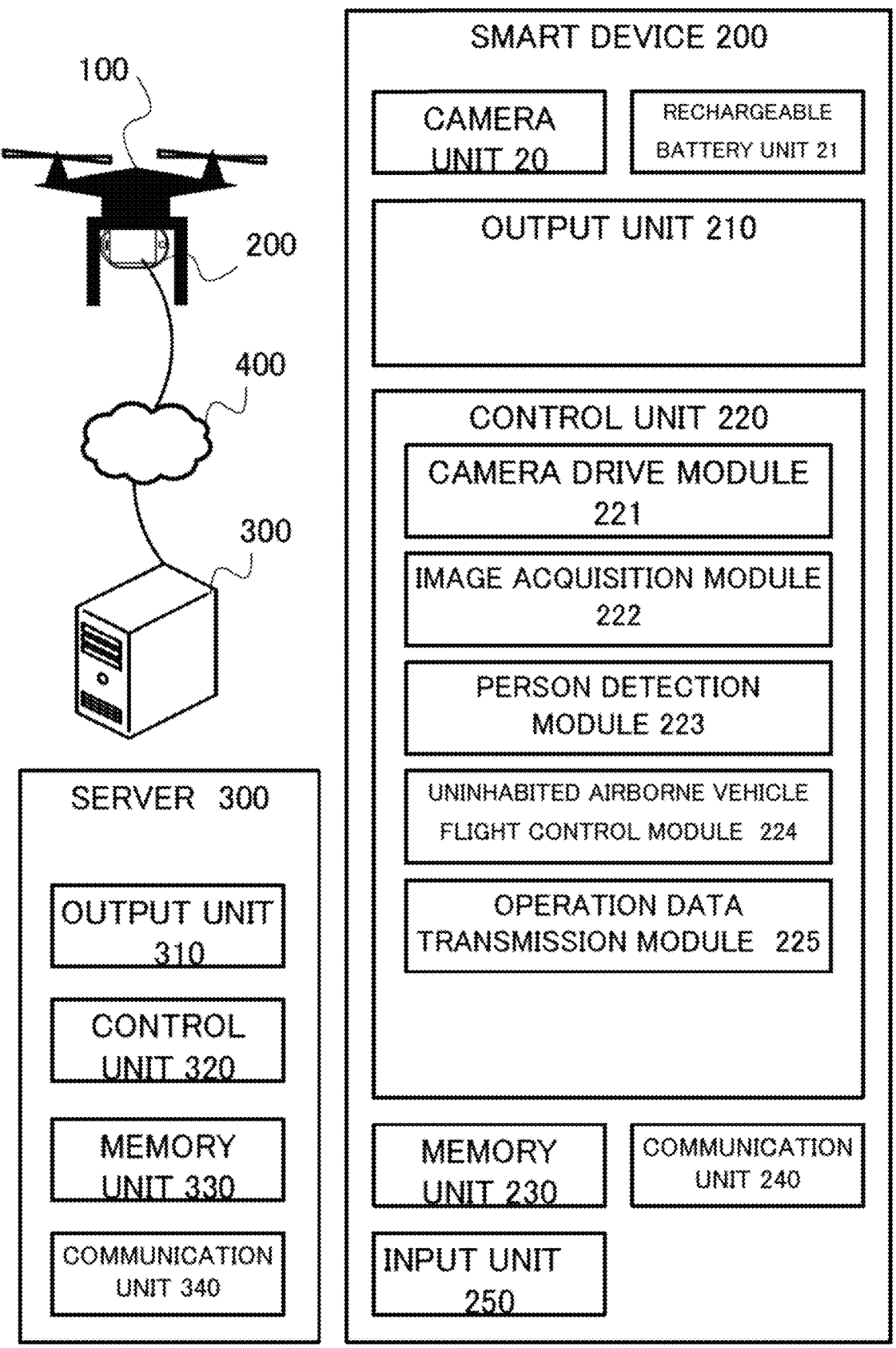
FIG. 9 shows a functional block diagram of the smart device 200 with an operation data transmission function and the server 300 to illustrate the relationship among the functions.

FIG. 9 shows a functional block diagram of the smart device 200 with an operation data transmission function and the server 300 to illustrate the relationship among the functions. The smart device 200 has the operation data transmission module 225 in the control unit 220 in addition to the functions shown in FIG. 2. Although not shown in FIG. 9, the smart device 200 is connected with the uninhabited airborne vehicle 100 with the same functions as those shown in FIG. 2 to control it. The server 300 includes an output unit 310, a control unit 320, a memory unit 330, and a communication unit 340. The smart device 200 and the server 300 can communicate with each other through a communication network 400. The communication network 400 may be a public line network such as the Internet or a private line network.

The server 300 may be a general server provided with the functions to be described later.

The server 300 has functions necessary to output the received operation data as the output unit 310. The output unit 310 may be a liquid crystal display, a PC display, a projector, etc., to display images. The output unit 310 may also be a speaker, a headphone, an earphone, etc., to output voice. The features of the present invention are not limited in particular by the output method.

The Control Unit 320 Includes a CPU, a RAM, and a ROM.

The memory unit 330 includes a data storage unit such as a hard disk or a semiconductor memory. The memory unit 330 stores the received operation data. The memory unit 330 also stores information on the uninhabited airborne vehicle 100 and the smart device 200 as needed.

The communication unit 340 includes a Wi-Fi® enabled device complying with, for example, IEEE 802.11, or a wireless device complying with the IMT-2000 standard such as the third generation mobile communication system. The communication unit may include a wired device for LAN connection. The communication unit 340 communicates with the smart device 200 through a communication network 400.

Figure 10:
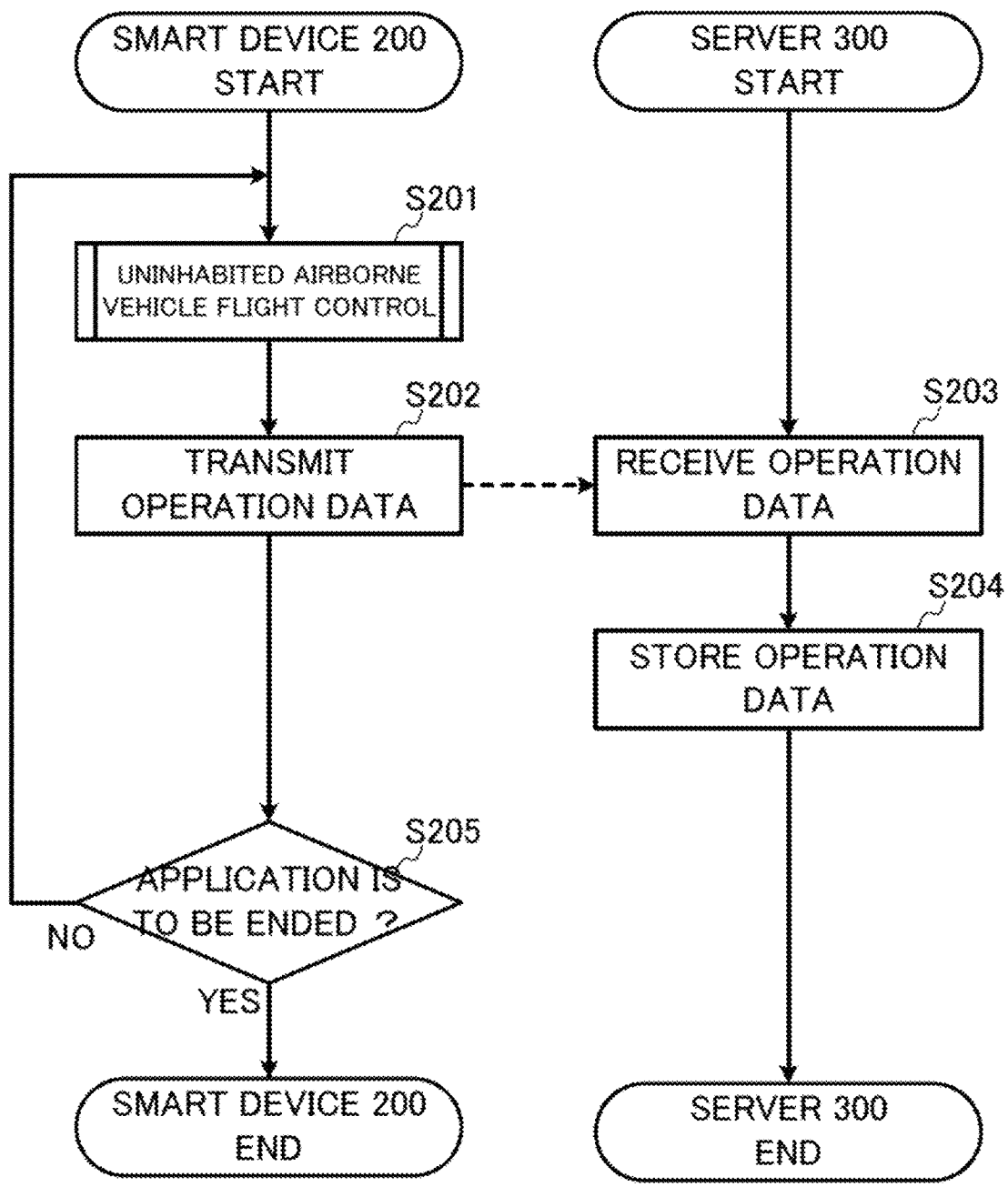
FIG. 10 shows a flow chart when the smart device 200 transmits operation data to the server 300.

FIG. 10 shows a flow chart when the smart device 200 transmits operation data to the server 300. The uninhabited airborne vehicle flight control process in the step S201 in FIG. 10 is based on the person detection corresponding to the steps S101 to S107 of the flow chart shown in FIG. 3. FIG. 10 does not show the flow chart of the uninhabited airborne vehicle 100. However, in the uninhabited airborne vehicle flight control process in the step S201, the control unit 120 of the uninhabited airborne vehicle 100 controls the rotary wing 110 as well as the mechanism of the uninhabited airborne vehicle 100 to achieve the flight to avoid a person in response to the control by the uninhabited airborne vehicle flight control module 224.

After the step S201, the operation data transmission module 225 of the smart device 200 transmits the operation data to the server 300 through the communication unit 240 (Step S202). The operation data herein includes a date and time and a detail when the application for controlling the flight of an uninhabited airborne vehicle performs each step of the flow chart shown in FIGS. 3 and 10. If the uninhabited airborne vehicle flight control module 224 controls the uninhabited airborne vehicle 100 to avoid a person, a detail of the control for the avoidance is preferably included. The operation data may include a detail of the above-mentioned operation history. If the smart device 200 has a GPS function, the operation data may include the GPS information such as the latitude, the longitude, and the altitude at a regular time interval after the uninhabited airborne vehicle 100 starts to fly.

The server 300 receives the operation data through the communication unit 340 (Step S203).

After receiving the operation data, the control unit 320 stores the operation data in the memory unit 330 (Step S204). The stored data is displayed on the output unit 310 so that the data can be used when the operations of the uninhabited airborne vehicle 100 and the smart device 200 are verified and checked.

The control unit 220 of the smart device 200 checks whether or not to end the application for controlling the flight of an uninhabited airborne vehicle after transmitting the operation data (Step S205). If judging to end the application, the control unit 220 does so. If judging not to end the application, the control unit 220 returns to the step S201 and continues the process. If the control unit 220 returns to the step S201 to continue the uninhabited airborne vehicle flight control process, the steps S101 and S102 shown in FIG. 3 may not be performed. The application for controlling the flight of an uninhabited airborne vehicle may be ended by the input unit 250 of the smart device 200, by other information devices (not shown) with capability to communicate with the smart device 200 through wireless connection, or by the server 300. Alternatively, the smart device 200 may be set to automatically end the application for controlling the flight of an uninhabited airborne vehicle after the uninhabited airborne vehicle 100 lands on the ground. Furthermore, after a certain time or if the battery level of the rechargeable battery unit 21 decreases below a constant value, the application for controlling the flight of an uninhabited airborne vehicle may be ended.

FIG. 10 shows an example where the operation data is transmitted at a constant period when an image is acquired and analyzed. However, the operation data may be collectively transmitted before the application for controlling the flight of an uninhabited airborne vehicle ends.

As described above, the operation data transmission function provided in the smart device 200 allows the server 300 to verify and check the operations of the uninhabited airborne vehicle 100 and the smart device 200. Furthermore, if a plurality of uninhabited airborne vehicles 100 exist, the operation data may be accumulated in a database installed in the memory unit 330 of the server 300 so that the data can be compared and examined. Therefore, the operation data transmission function can help improve the uninhabited airborne vehicle flight control process.

In this embodiment, the smart device 200 has the person detection module 223. However, the smart device 200 may transmit a taken image to the server 300, and then the control unit 320 of the server 300 may analyze the image. In this case, the image is analyzed based on a number of cases accumulated in the server 300 so that a person can be detected with more accuracy.

Speed Control Function

Figure 11:
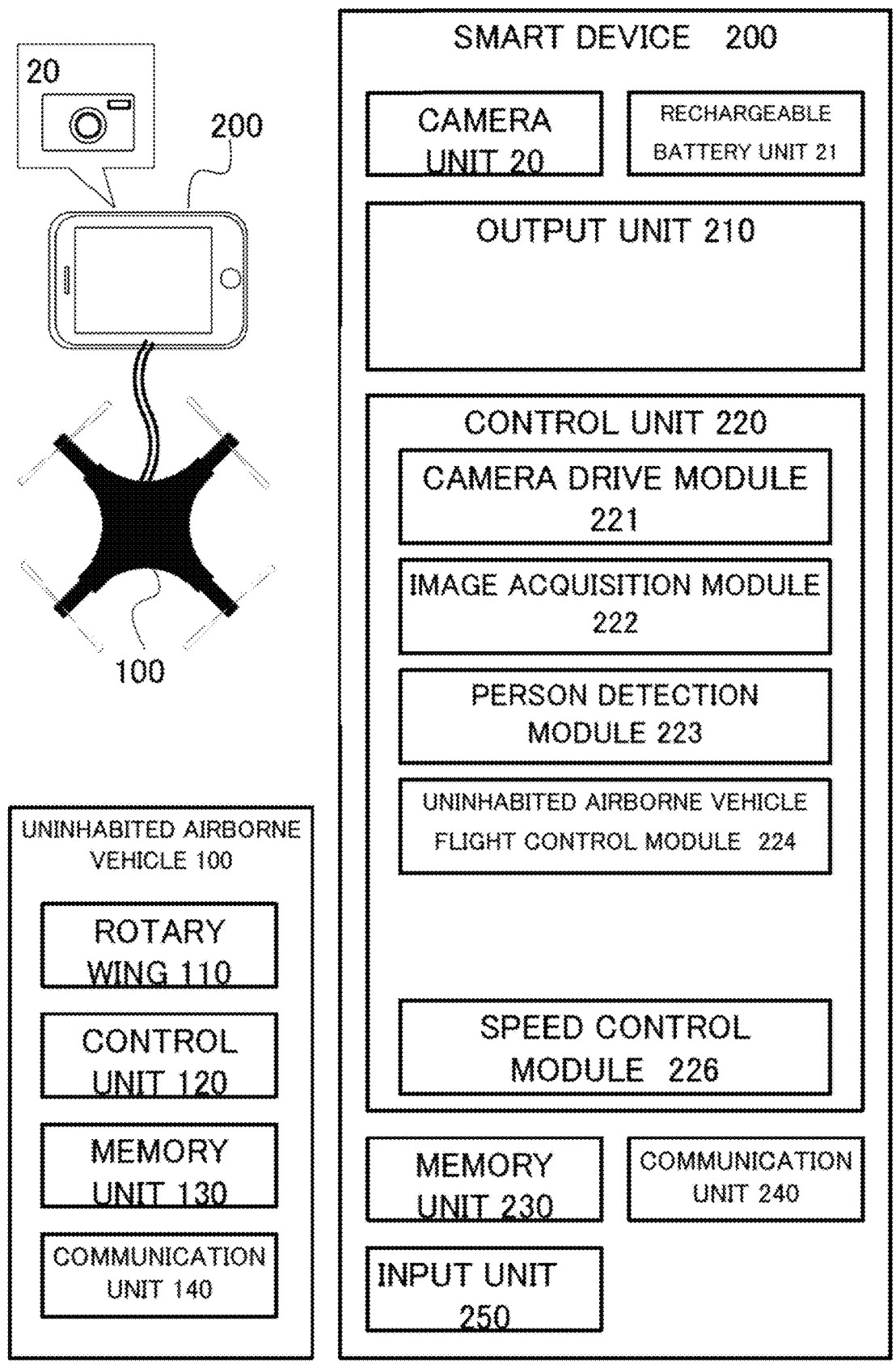
FIG. 11 shows a functional block diagram of the uninhabited airborne vehicle 100 and the smart device 200 with a speed control function to illustrate the relationship among the functions.

FIG. 11 shows a functional block diagram of the uninhabited airborne vehicle 100 and the smart device 200 with a speed control function to illustrate the relationship among the functions. The uninhabited airborne vehicle 100 has functions equal to those shown in FIG. 2. The smart device 200 has the speed control module 226 in the control unit 220 in addition to the functions shown in FIG. 2. If the smart device 200 has a speed control function, the smart device 200 is connected with the uninhabited airborne vehicle 100 by a cable, the rechargeable battery unit 21 of the smart device 200 can feed power to the uninhabited airborne vehicle 100.

Figure 12:
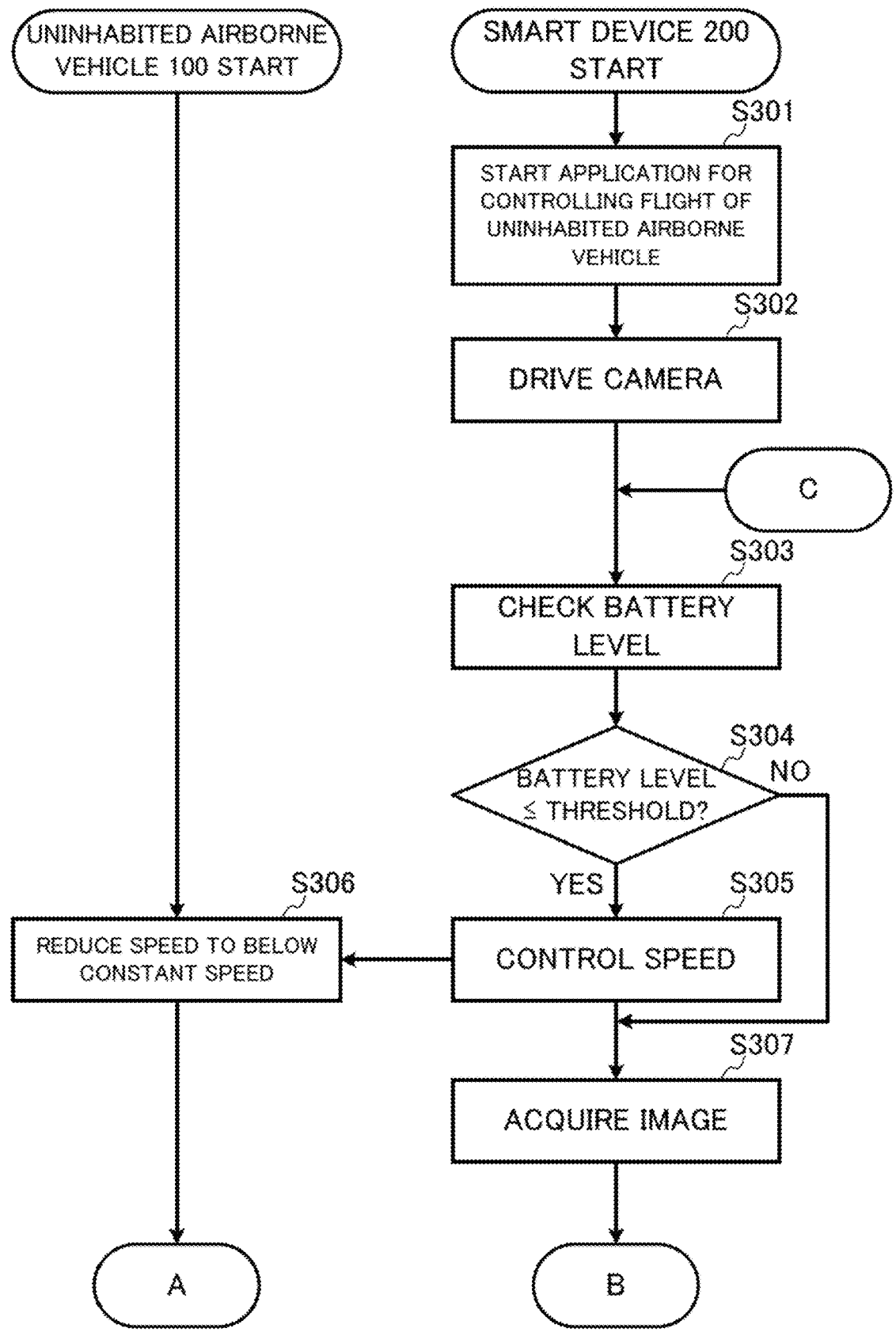
FIGS. 12 and 13 show a flow chart of the uninhabited airborne vehicle 100 and the smart device 200 with a speed control function.
Figure 13:
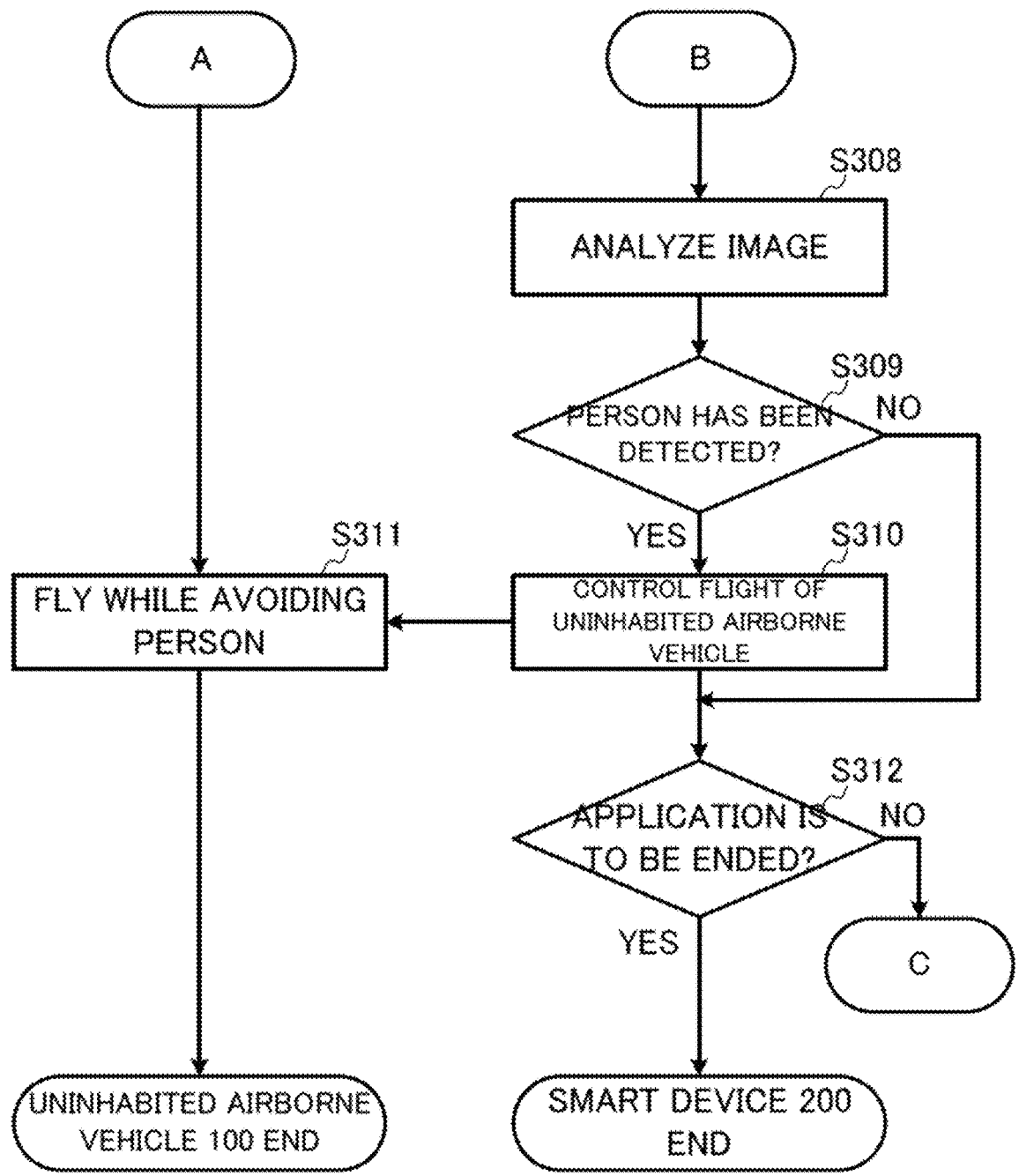

FIGS. 12 and 13 show a flow chart of the uninhabited airborne vehicle 100 and the smart device 200 with a speed control function. "A" and "B" shown in FIG. 12 are continued to "A" and "B" shown in FIG. 13, respectively. "C" shown in FIG. 13 is continued to "C" shown in FIG. 12.

First, the user starts the application for controlling the flight of an uninhabited airborne vehicle of the smart device 200 (Step S301). The application for controlling the flight of an uninhabited airborne vehicle may be started by the input unit 250 of the smart device 200 or by other information devices (not shown) with capability to communicate with the smart device 200 through wireless connection. Alternatively, the smart device 200 may be set to automatically start the application for controlling the flight of an uninhabited airborne vehicle after the uninhabited airborne vehicle 100 starts to fly. The uninhabited airborne vehicle 100 may start to fly before or after the application for controlling the flight of an uninhabited airborne vehicle is started. The usual operation of the uninhabited airborne vehicle 100 may be controlled by using a transmitter for a radio controller, by a program installed in the smart device 200 to autonomously control the uninhabited airborne vehicle 100 to fly along a predetermined course, or by other information devices (not shown) with capability to communicate with the smart device 200 through wireless connection.

Then, the camera drive module 221 of the smart device 200 drives a camera of the camera unit 20 to start to take an image (Step S302). The camera unit 20 may take an image by visible light or thermal photography. If the camera unit 20 has a visible light imaging function and a thermal photography imaging function, the imaging function to be used may be automatically selected or may be set by the user through the input unit 250 of the application for controlling the flight of an uninhabited airborne vehicle.

Then, the speed control module 226 of the smart device 200 checks the battery level of the rechargeable battery unit 21 (Step S303). At this point, the speed control module 226 may acquire the battery level of the rechargeable battery unit 21 in percent figures. The speed control module 226 may also check how many minutes are left for the battery level of the rechargeable battery unit 21 to feed power to the uninhabited airborne vehicle 100.

The speed control module 226 checks whether or not the battery level of the rechargeable battery unit 21 is a threshold or less (Step S304). The threshold is predetermined based on the capabilities of the wireless aircraft 100 and the smart device 200. The threshold can be changed by instruction from the user. Examples of the threshold include "20 percent" if the battery level of the rechargeable battery unit 21 is acquired in percent figures and "10 minutes" if how many minutes are left for battery level of the rechargeable battery unit 21 to feed power to the uninhabited airborne vehicle 100 is checked.

If the battery level of the rechargeable battery unit 21 is a threshold or less, the speed control module 226 controls the speed of the uninhabited airborne vehicle 100 through the communication unit 240 (Step S305). If the battery level of the rechargeable battery unit 21 is more than a threshold, the process proceeds to the step S307.

The control unit 120 of the uninhabited airborne vehicle 100 reduces the flight speed of the uninhabited airborne vehicle 100 to below a constant speed in response to the speed control from the speed control module 226 of the smart device 200 (Step S306). The constant speed herein is determined based on the capability of the uninhabited airborne vehicle 100. The constant speed can be changed by instruction from the user.

The image acquisition module 222 of the smart device 200 acquires the image taken by the camera unit 20 (Step S307). The image acquisition module 222 converts the taken image into digital data and stored in the memory unit 230. The image acquisition module 222 may control the camera unit 20 to take an image in the flight direction of the uninhabited airborne vehicle 100 while the uninhabited airborne vehicle 100 is flying.

As shown in FIG. 13, the person detection module 223 analyzes the image stored in the memory unit 230 and detects whether or not the image contains a person (Step S308). The existing technologies may be used to detect a person as described above, which do not limit the present invention in particular.

Then, the uninhabited airborne vehicle flight control module 224 checks whether or not the person detection module 223 has detected a person (Step S309).

If the person detection module 223 has detected a person, the uninhabited airborne vehicle flight control module 224 controls the flight of the uninhabited airborne vehicle 100 through the communication unit 240 to keep the uninhabited airborne vehicle 100 from hitting against the detected person (Step S310). The operations of the uninhabited airborne vehicle 100 to fly while avoiding a person may be the same way all the time or may be previously set if a plurality of the operations are possible. The details are as described above with reference to FIG. 6.

The control unit 120 of the uninhabited airborne vehicle 100 controls the rotary wing 110 as well as the mechanism of the uninhabited airborne vehicle 100 to fly while avoiding a person in response to the control by the uninhabited airborne vehicle flight control module 224 (Step S311). The control unit 120 of the uninhabited airborne vehicle 100 allows the uninhabited airborne vehicle flight control module 224 to perform the flight control to avoid a person in priority to the usual operation.

If a person is not detected in the step S309, the control unit 220 ends the uninhabited airborne vehicle flight control module 224 and proceeds to the next step S312.

The control unit 220 checks whether or not to end the application for controlling the flight of an uninhabited airborne vehicle (Step S312). If judging to end the application, the control unit 220 does so. If judging not to end the application, the control unit 220 returns to the step S303 and continues the process. The application for controlling the flight of an uninhabited airborne vehicle may be ended by the input unit 250 of the smart device 200 or by other information devices (not shown) with capability to communicate with the smart device 200 through wireless connection. Alternatively, the smart device 200 may be set to automatically end the application for controlling the flight of an uninhabited airborne vehicle after the uninhabited airborne vehicle 100 lands on the ground. Furthermore, after a certain time or if the battery level of the rechargeable battery unit 21 decreases below a constant value, the application for controlling the flight of an uninhabited airborne vehicle may be ended.

In this embodiment, the speed is controlled in only one step based on the battery level of the rechargeable battery. However, the speed may be controlled in multiple steps, for example, to be at "6 km per hour or less if the battery level is 20 percent or less" and "4 km or less per hour if the battery level is 10 percent or less."

As described above, the speed control function provided in the smart device 200 can control the flight speed of the uninhabited airborne vehicle 100 based on the battery level of the rechargeable battery unit 21 of the smart device 200 to fly the uninhabited airborne vehicle 100 at a lower speed for a longer time if the battery is running out. Furthermore, the speed control function can provide the application for controlling the flight of an uninhabited airborne vehicle that is safe to people even if the battery has run out.

The embodiments of the present invention are described above. However, the present invention is not limited to these above-mentioned embodiments. The effect described in the embodiments of the present invention is only the most preferable effect produced from the present invention. The effects of the present invention are not limited to that described in the embodiments of the present invention.

REFERENCE SIGNS LIST

100 Uninhabited airborne vehicle
200 Smart device
300 Server
400 Communication network
500 Person

What is claimed is:

1. A smart device that controls a flight of an uninhabited airborne vehicle and is connected with the uninhabited airborne vehicle, the smart device comprising:
   a camera; and
   a processor that:
      drives camera;
      acquires an image taken by the camera;
      analyzes the acquired image and detects a person;
      controls the flight of the uninhabited airborne vehicle to keep the uninhabited airborne vehicle from hitting against the detected person; and
      controls a speed of the uninhabited airborne vehicle based on a battery level of a rechargeable battery of the smart device when the rechargeable battery feeds power to the connected uninhabited airborne vehicle.

2. The smart device according to claim 1, wherein the processors analyzes the acquired image by analyzing the image taken by visible light of the camera.

3. The smart device according to claim 1, wherein the processors analyzes the acquired image by analyzing the image taken by thermal photography of the camera.

4. The smart device according to claim 1, wherein the processor executes displaying operation history of the uninhabited airborne vehicle on an output unit of the smart device.

5. The smart device according to claim 1, wherein the processor executes transmitting operation data on the uninhabited airborne vehicle to a server connected through a network.

6. The smart device according to claim 1, wherein the uninhabited airborne vehicle is connected with the smart device through USB.

7. A method for controlling a flight of an uninhabited airborne vehicle by a smart device connected with the uninhabited airborne vehicle, the method comprising:
   driving a camera provided in the smart device;
   acquiring an image taken by the camera;
   analyzing the acquired image and detects a person;
   controlling the flight of the uninhabited airborne vehicle to keep the uninhabited airborne vehicle from hitting against the detected person; and
   controlling a speed of the uninhabited airborne vehicle based on a battery level of a rechargeable battery of the smart device when the rechargeable battery feeds power to the connected uninhabited airborne vehicle.

* * * * *